May 28, 1968   L. CRABBÉ   3,385,032
APPARATUS FOR WET-CLEANING DUST-LADEN GASES
Filed Nov. 30, 1965

INVENTOR:
LÉON CRABBÉ
BY Howson & Howson
ATTYS.

United States Patent Office 3,385,032
Patented May 28, 1968

3,385,032
APPARATUS FOR WET-CLEANING
DUST-LADEN GASES
Léon Crabbé, Domaine-de-Waroux, Belgium, assignor to Aktiebolaget Svenska Flaktfabriken, Stockholm, Sweden
Filed Nov. 30, 1965, Ser. No. 510,586
Claims priority, application Sweden, Dec. 3, 1964, 14,595/64
6 Claims. (Cl. 55—249)

ABSTRACT OF THE DISCLOSURE

Apparatus wherein dust-laden gases are caused to wipe across the surface of a body of washing liquid to remove dust particles therefrom. The apparatus has a partition to separate the casing of the apparatus into an inlet chamber and a discharge chamber which are connected by an elongated slot through which the gas must pass. An extension of the partition is pivoted within the slot to afford control of the gas flow through the slot and to provide a provide a venturi effect. A baffle above the slot forms a liquid curtain through which the gas flows upon leaving the slot. A drop separator is provided between the slot and the discharge opening.

---

Figure 1:
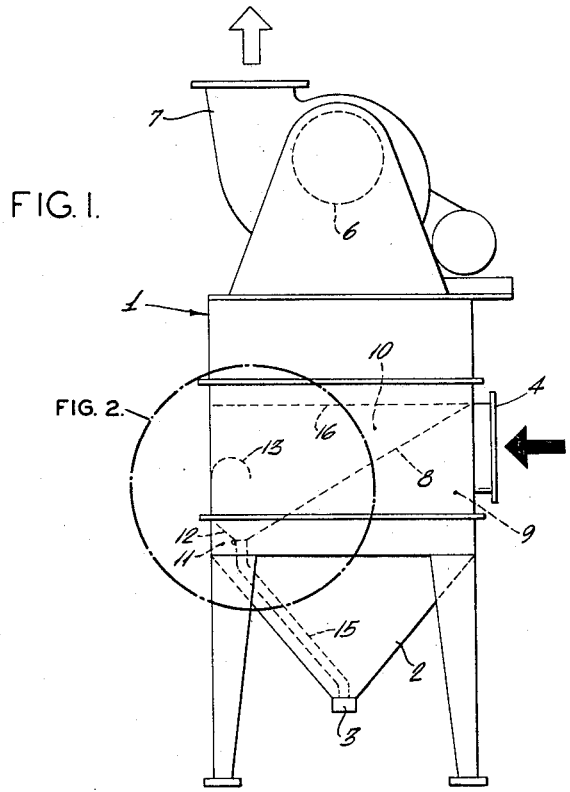

The present invention relates to apparatus adapted to wet-clean dust-laden gases, comprising an apparatus casing having in its lower part a basin for washing liquid and provided with a drain valve for impurities separated from the gases blown against the washing liquid. Above the liquid surface in the basin, the casing has an inlet opening for the gas to be cleaned and in the upper part of the casing, there is an outlet opening for the cleaned gas.

Previously known apparatus of this type have different casing designs and different positions of the inlets and outlets for the gas in relation to the liquid basin, with guide plates and guide vanes for directing the gas flow. The known wet cleaners exhibit the disadvantage that their guide plates and guide vanes are fixedly mounted so that the separators operate in a satisfactory manner only for the separation of dust from gas having a given flow and with a certain concentration and nature of the dust included therein.

The present invention has as its object to produce by simple means a structurally uncomplicated apparatus, which at the same time, provides the advantage of operating with optimum separation effect irrespective of fluctuations or variations in the gas flow and in the concentration and nature of the dust, and also the advantage of maintaining the fresh water consumption at a very low level.

Apparatus according to the invention is characterized in that the casing is divided into an inlet chamber and a discharge chamber by a partition wall mounted above the gas inlet, which wall extends toward the opposite side wall of the casing in an obliquely downward direction toward the surface of the liquid in the basin, and terminates immediately adjacent to said opposite side wall to form a long and narrow passage connecting said inlet chamber and said discharge chamber with one another. At some distance above said passage, there is mounted a downwardly-bent baffle projecting inwardly from the side wall operable to form a liquid curtain overlying the partition intermediate the passage and the discharge chamber. The partition wall is provided with a pivoted extension which is directed upwardly to give said passage a venturi-like shape and renderng it possible to control the flow area of said passage.

In a preferred embodiment of the apparatus, at the lowest point of the partition wall there is a drain pipe, opening into the bottom of the liquid basin for returning any liquid ejected through said passage.

For separating the water droplets from the gas flow from the passage, the apparatus, when it is not connected with a separate drop separator, is provided with a dewatering grate placed in the discharge chamber and extending across the entire cross-sectional area of the apparatus.

Because of the disposition and design of the partition wall, the entering dust-laden air is forced to wipe over the entire liquid surface, thus rendering possible a first separation of particularly coarse particles before the final gas cleaning is effected in the liquid curtain formed close to the opposite side wall by the baffle mounted there. At the same time, the partition wall insures a uniform distribution of the clean gas over the surface of the dewatering grate. Furthermore, the assembly height of the apparatus is reduced by the placing of the gas inlet opening and outlet opening on opposite sides of a declining partition wall. Due to the fact that the water from the liquid curtain is conducted away through a special drain pipe opening into the bottom of the basin, the concentration and sedimentation of the dust is directed to this part of the basin, from which it can be drained at certain timed intervals.

Figure 2:
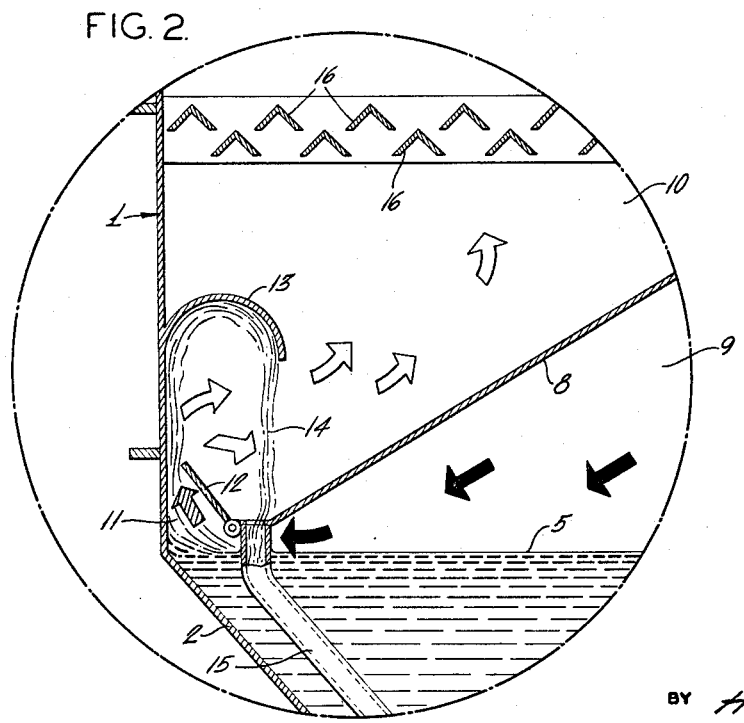

The invention will now be described in greater detail with reference to the accompanying drawing wherein:

FIG. 1 is a side view of apparatus made in accordance with the present invention; and FIG. 2 is an enlarged sectional view of that portion of the apparatus encircled in FIG. 1.

Referring to the drawing, the apparatus comprises a generally rectangular casing 1, the lower portion of which is designed like a basin 2 and is provided at its bottom with a drain valve 3. An inlet opening 4 for raw gas is located in one side wall above the liquid surface 5. In the top of the casing is an outlet opening 6 for the cleaned gas, in the illustrated embodiment connected to a fan 7.

In accordance with the invention, an imperforate partition wall 8 divides the casing 1 into an inlet chamber 9 and a discharge chamber 10. The partition wall is mounted on the one side wall above the gas inlet and intermediate said inlet and outlet openings, and extends towards the opposite side wall obliquely downwards towards the surface 5 of the liquid in the basin 2. The partition wall terminates immediately adjacent the opposite side wall of the casing and forms a long and narrow passage 11 connecting said inlet and discharge chambers with one another. An extension 12 is pivoted to the terminus of the partition 8 and is directed upwardly, giving said passage 11 a venturi-like shape and rendering possible the control of the flow area of said passage.

A downwardly bent baffle 13 spaced upwardly from the passage projects inwardly from the opposite side wall for deflecting the gas and the entrained liquid, which at the free edge of the baffle, forms a liquid curtain 14 through which the gas must flow. As shown, the baffle 13 is curved and merges with said opposite side wall.

A drain pipe 15 is mounted at the lowest point of the partition wall and opens into the liquid basin below the surface of the liquid, preferably at the bottom of the casing 1, for returning the liquid ejected through said passage. A dewatering grate 16 is placed in the discharge chamber 10 and extends across the entire cross-sectional area of the apparatus between the opposite side walls.

While a particular embodiment of the present invention has been herein illustrated and described, it is not intended to limit the invention to such disclosure, but

I claim:

1. Apparatus for wet-cleaning dust-laden gases, comprising an upright casing having a lower portion forming a basin for washing liquid, a bath of liquid in said basin having a liquid surface, said casing being provided with an inlet opening located above said liquid surface adjacent one side wall of the casing for the gas to be cleaned, and an outlet opening located in the upper part of the casing for the cleaned gas, the improvement wherein said casing includes an imperforate partition wall mounted intermediate said inlet and outlet openings and declining obliquely from said one side wall above said inlet opening toward the opposite side wall of the casing above said liquid surface and having a lower terminus immediately above said surface adjacent said opposite side wall to form a long and narrow flow passage between said partition and said surface adjacent said lower terminus, said partition defining inlet and outlet chambers interconnected by said flow passage, the oblique declination of said partition toward the liquid surface causing the incoming gas to wipe over the entire liquid surface, and a pivoted extension at said lower terminus directed upwardly away from said liquid surface and said lower terminus toward said opposite side wall to give said passage a venturi-like shape and to control the flow area between said extension and said opposite side wall.

2. Apparatus according to claim 1 including a dewatering grate located in the outlet chamber and extending across the entire cross-sectional area of the apparatus between the aforesaid side walls above said partition.

3. Apparatus according to claim 1 including a drain pipe at a lower point of said partition wall extending into the casing below the liquid surface for returning the liquid ejected through said passage.

4. Apparatus according to claim 3 including a drain valve in the bottom of said casing, said drain pipe opening into said drain valve.

5. Apparatus according to claim 1 including a baffle spaced above said passage and projecting inwardly and downwardly to deflect the cleaned gas and entrained liquid so as to form a liquid curtain through which the cleaned gas must pass.

6. Apparatus according to claim 5 wherein said baffle is curved and merges with said opposite side wall.

References Cited

UNITED STATES PATENTS

| | | | |
|---|---|---|---|
| 1,926,433 | 9/1933 | Cartmell | 55—468 |
| 2,546,259 | 3/1951 | Fenn | 55—257 |
| 2,751,998 | 6/1956 | Glasgow | 210—188 |
| 3,093,468 | 6/1963 | Krochta. | |
| 3,168,030 | 2/1965 | Wilhelmsson et al. | 261—112 |
| 3,199,267 | 8/1965 | Hausberg | 55—257 |

HARRY B. THORNTON, *Primary Examiner.*

FRANK W. LUTTER, *Examiner.*

B. NOZICK, *Assistant Examiner.*